United States Patent [19]

Stoudt et al.

[11] 3,801,460

[45] Apr. 2, 1974

[54] SIMULTANEOUS STEROID OXYGENATION AND 1-DEHYDROGENATION WITH BACILLUS CEREUS

[75] Inventors: Thomas H. Stoudt, Westfield; Robert A. Long, East Brunswick, both of N.J.

[73] Assignee: Merck & Co., Inc., Rahway, N.J.

[22] Filed: Dec. 18, 1970

[21] Appl. No.: 99,682

Related U.S. Application Data

[63] Continuation-in-part of Ser. No. 722,131, April 17, 1968, abandoned, which is a continuation of Ser. No. 601,313, Dec. 13, 1966, which is a continuation of Ser. No. 545,876, April 28, 1966, abandoned, which is a continuation of Ser. No. 387,219, Aug. 3, 1964, abandoned, which is a continuation-in-part of Ser. No. 208,608, July 9, 1962, abandoned.

[52] U.S. Cl............................... 195/51 A, 195/51 E
[51] Int. Cl................... C07c 167/08, C07c 167/14
[58] Field of Search.......................... 195/51 E, 51 A

[56] References Cited
OTHER PUBLICATIONS

McAleer et al., Arch. Biochem. Bioanys. Vol. 73 pages 127–130 (1958).

Shirasaka et al., J. Gen Appl. Microbiol. (Japan) Vol. 7 supp. 1 1961 pages 341–352.

*Primary Examiner*—Alvin E. Tanenholtz

[57] ABSTRACT

The invention disclosed herein relates to the process in which an 11-desoxy-3-oxygenated -$\Delta^4$-steroid is subjected to the action of Bacillus cereus microorganisms thereby effecting simultaneous oxygenation (i.e., 11-hydroxylation) and $\Delta^1$-dehydrogenation of the steroid to produce an 11$\beta$-hydroxy-3-oxygenated-$\Delta^{1,4}$steroid. For example, the 11-desoxy-3-oxygenated-$\Delta^4$steroid, Compound S, is converted directly by this microbiological oxygenation-dehydrogenation procedure to its 11$\beta$-hydroxy-$\Delta^1$-dehydro analog, prednisolone, which is known to be useful as an anti-inflammatory agent.

4 Claims, No Drawings

SIMULTANEOUS STEROID OXYGENATION AND 1-DEHYDROGENATION WITH BACILLUS CEREUS

This is a continuation-in-part of Ser. No. 722,131, filed Apr. 17, 1968, now abandoned, which is a continuation of Ser. No. 601,313, filed Dec. 13, 1966, which is a continuation of Ser. No. 545,876, filed Apr. 28, 1966, now abandoned, which is a continuation of Ser. No. 387,219, filed Aug. 3, 1964, now abandoned, which, in turn, is a continuation-in-part of Ser. No. 208,608, filed July 9, 1962, now abandoned.

This invention relates to a novel method of making steroids, and more particularly, is concerned with the process of preparing 11$\beta$-hydroxy-3-oxygenated-1,4-pregnadienes and 11$\beta$-hydroxy-3-oxygenated-1,4-androstadienes by subjecting 3-oxygenated-4-pregnenes and 3-oxygenated-4-androstenes to the action of a strain of *Bacillus cereus*.

The discovery of the remarkable therapeutic properties of prednisolone and similar related compounds having a double bond at C–1(2) and a hydroxy substituent at C–11 has stimulated wide interest in finding simple and more economical methods of preparing such compounds. Two of the principal difficulties encountered in the synthesis of prednisolone and its related compounds from commercially available starting materials are the introduction of the $\Delta^1$-bond and the introduction of the 11-hydroxy substituent. Although various methods have been developed for the synthesis of these steroids, such processes are not entirely satisfactory and other methods more suitable for the preparation of these steroids in high yields have been sought.

Methods for effecting the oxygenation of steroids by the action of microorganisms are known in the art as, for example, microorganisms belonging to the Order Mucorales introduce oxygen in the 6, 11, or 14 positions of the steroid ring structure. Various methods are also known for effecting a dehydrogenation of steroids at the 1-position as, for example, the conversion of hydrocortisone to prednisolone by *Bacillus sphaericus* as described by Stoudt, et al, in the Arch. Biochem & Biophys. 59, 30 (1955).

What is described herein, however, is a microbial method of producing an 11-oxygenation and a 1-dehydrogenation of steroids within a single process step. In accordance with the invention, *Bacillus cereus* is shown to effect the transformation of 3-oxygenated-4-pregnenes or 3-oxygenated-4-androstenes, including substituted derivatives thereof, to the corresponding 11$\beta$-hydroxy-3-oxygenated-1,4-pregnadienes or 11$\beta$-hydroxy-3-oxygenated-1,4-androstadienes. In a preferred form of the present invention 4-pregnene-17$\alpha$, 21-diol-3,20-dione (also known as Reichstein's Compound S or 11-desoxy-17$\alpha$-hydroxycorticosterone) is converted to prednisolone by the action of enzymes produced by the *Bacillus cereus* microorganism.

Accordingly, it is an object of the present invention to provide a microbial process for effecting 11-oxygenation and 1-dehydrogenation of steroids in a single step. Other objectives will be apparent from the detailed description of the invention hereinafter provided.

In accordance with the present invention, it is now found that oxygenation-dehydrogenation of steroids is conveniently effected by subjecting steroids to the action of any 11$\beta$-hydroxylating-$\Delta^1$-dehydrogenating strain of *Bacillus cereus* or to the oxygenating-dehydrogenating enzymes produced by such microorganism strains.

The practice of this invention is particularly suitable, therefore, in converting 1,2-dihydro-11-desoxysteroids unsaturated at the 4,5-position, i.e., steroids containing at least one hydrogen atom at $C_1$, $C_2$ and $C_{11(\beta)}$ to the corresponding $\Delta^1$-11$\beta$-hydroxy-steroids in high yields. Thus, the invention provides a valuable means for producing prednisolone and compounds related thereto.

The microorganism *Bacillus cereus*, employed herein, is identified and characterized in "Bergey's Manual of Determinative Bacteriology" (Seventh Edition), pages 617–8. Strains of *Bacillus cereus* capable of effecting the desired conversion of steroids, as described herein, can be obtained from known culture collections. For example, one preferred strain of a culture of *Bacillus cereus*, ATCC No. 14,737, is available to the public and can be obtained from the American Type Culture Collection, 12301 Parklawn Drive, Rockville, Md. Other preferred 11$\beta$-hydroxylating-$\Delta^1$-dehydrogenating strains of *Bacillus cereus* may be selected by the following test method: a nutrient medium containing 1 g. of meat extract, 1 g. of glycerol, 0.1 g. of $KH_2PO_4$, 0.15 g. of calcium chloride, and sufficient distilled water to make 100 ml., is adjusted to pH 7.0, sterilized and inoculated with a culture of the particular strain of *Bacillus cereus* to be tested for its oxygenating-dehydrogenating activity. The inoculated nutrient medium is incubated at a temperature of about 28°C., while being agitated in the presence of oxygen, for a period of about 24–28 hours. To the resulting culture is then added a solution containing 25 mg. (0.025%) of Compound S (4-pregnene-17$\alpha$, 21-diol-3,20-dione) dissolved in 0.25 ml. of dimethylformamide. The culture containing the steroid compound is incubated, with agitation and aeration, for an additional period of about 16 hours at 28°C. The fermentation broth is adjusted to a pH of about 4.0, and extracted with five 50 ml.-portions of ethyl acetate, and the ethyl acetate extracts are combined and evaporated to dryness in vacuo. A portion of the residual material is dissolved in acetone and spotted on a paper chromagram which is developed using formamide as the stationary phase and chloroform as the mobile phase; the presence of a band corresponding to the 11$\beta$-hydroxy-$\Delta^1$-dehydro derivative of Compound S (1,4-pregnadiene-11$\beta$, 17$\alpha$, 21-triol-3,20-dione, i.e., prednisolone), and having an ultraviolet maximum of 242 m$\mu$ demonstrate that the test strain is an 11$\beta$-oxygenating-$\Delta^1$-dehydrogenating strain of *Bacillus cereus*.

In carrying out the process of the invention the steroid to be oxygenated and dehydrogenated is subjected to the action of oxygenating-dehydrogenating enzymes produced by growing a suitable strain of *Bacillus cereus*. This is most conveniently accomplished by growing the microorganism under aerobic conditions in a suitable nutrient medium in intimate contact with the steroid to be oxygenated-dehydrogenated; the fermentation or growing of the microorganism being continued until the desired oxygenation-dehydrogenation has occurred. Thus, the steroid to be so converted can be incorporated directly in a suitable medium which is then inoculated with an oxygenating-dehydrogenating strain of *Bacillus cereus* and incubated under aerobic conditions thereby effecting the desired oxygenation-dehydrogenation. Generally, the process is preferably effected by first growing the microorganism in a suitable fermentation medium, then adding the steroid and continuing the cultivation of the microorganism under aerobic conditions for sufficient time to effect the desired transformations.

The steroid can be added to the nutrient medium as a suspension in a suitable solvent such as water, as a solution in a solvent such as acetone or propylene glycol, or in a finely-divided form, such as a solid micronized powder. In general, it is desirable that the steroid be present in very finely divided form in order to permit maximum contact with the culture medium and insure completion of the reaction.

The process of the present invention can be effected in both stationary and submerged cultures of *Bacillus cereus* growing under aerobic conditions, although for practical purposes it is most conveniently carried out by growing the microorganism under submerged conditions in a suitable aqueous fermentation medium containing the steroid. The amount of the steroid which can be conveniently converted by our method will depend in part upon the particular environmental conditions employed and the specific steroid to be converted.

Aqueous nutrient mediums suitable for the growing of suitable strains of *Bacillus cereus* must contain sources of assimilable carbon and nitrogen as well as minor amounts of inorganic salts. Any of the usual sources of assimilable carbon such as glucose, invert molasses, sucrose, and the like, employed in fermentation media, can be used in carrying out the process of our invention. Similarly, complex sources of nitrogen usually employed in commercial fermentation processes such as lactalbumin digest ("Edamin") and corn steep liquor, or inorganic sources of nitrogen such as sodium nitrate, ammonium nitrate, and the like, are satisfactory for use in fermentation media. Minor amounts of inorganic salts, such as suitable soluble salts of magnesium, potassium, sodium and iron, are usually available in complex sources of carbon and nitrogen or may be conveniently added to the fermentation medium in minor amounts to promote maximum growth of the oxygenating-dehydrogenating microorganism.

The following is an example of a suitable aqueous nutrient medium which can be used in the process of the invention, although others may be used as well.

| | |
|---|---|
| Meat Extract | 1% |
| Glycerol | 1% |
| $KH_2PO_4$ | 0.1% |
| $CaCl_2$ | 0.15% |
| pH | 7.0 |

The addition of minor amounts of anti-foaming agents, although not essential, is desirable with some fermentation media in order to obtain maximum yields of the desired converted product. The addition to certain fermentation media of a substituted oxazaline which is a non-volatile, amine-type, cationic surface active agent is particularly effective in reducing the amount of foam, although other anti-foam agents known to be useful for this purpose can also be used.

As indicated above, the process of the invention is particularly useful in the oxygenation-dehydrogenation of 3-oxygenated-4-pregnenes, 3-oxygenated-4-androstenes, 3-oxygenated-4-estrenes, and derivatives thereof to obtain the corresponding 11-oxygenated-1-dehydrogenated steroids. Thus, the process is applicable in general to saturated and unsaturated cyclopentanopolyhydrophenanthrene compounds having at least a single hydrogen atom at $C_1$, $C_2$ and $C_{11(\beta)}$. Such cyclopentanopolyhydrophenanthrene compounds may be unsubstituted or may contain substituents such as keto, hydroxyl, acyloxy, halide, alkyl and the like at various positions of the cyclopentanopolyhydrophenanthrene nucleus. In addition, such compounds may have at the 17 position a ketol side chain, a saturated or unsaturated hydrocarbon side chain, a carboxy-containing side chain, and the like. Examples of classes of such cyclopentanopolyhydrophenanthrene compounds that might be mentioned are pregnenes, androstenes, bile acids, sterols, hormones, sapogenins, and derivatives thereof. Thus, representative steroids having at least one hydrogen atom at $C_1$, $C_2$ and $C_{11(\beta)}$, such as progesterone, 4-pregnene-17α-ol-3,20-dione, desoxycorticosterone, 4-pregnene-17α,21-diol-3,20-dione, 5-pregnene-3α-ol-20-one, 5,6-dichloro-4-pregnene-3β-ol-20-one, 5- or 4-cholenic acid, diosgenin, 16β-methyl Compound S, 16α-methyl Compound S, 6α, 16α-dimethyl Compound S, 16-methylene Compound S, 2-methyl Compound S, 6α-methyl Compound S, 16α-hydroxy Compound S, 6α-fluoro Compound S, and the like, can be converted at position one, two, and eleven, to obtain the corresponding $\Delta^1$-11-hydroxy derivatives.

For example, Compound S(4-pregnene-17α,21-diol-3,20 dione) can be converted to prednisolone with the following procedure: A sterile culture medium, such as those shown above, is first inoculated by introducing a small amount of a slant containing an oxygenating-dehydrogenating strain of *Bacillus cereus*. The inoculated nutrient medium is incubated at a temperature of about 28°C., while being agitated in the presence of oxygen for a period of about 24–28 hours. At this point, a solution of compound S is added to the fermentation medium and the agitation and aeration is continued for about 16 hours, or until the oxygenation-dehydrogenation is completed.

When the oxygenation-dehydrogenation is complete, the oxygenated-dehydrogenated steroid may be recovered from the fermentation broth by extraction with a suitable water-immiscible organic solvent for the oxygenated-dehydrogenated steroid. Suitable solvents for this purpose that might be mentioned are chloroform, methylene chloride, organic acid esters, aromatic hydrocarbons, and the like. The solvent solution containing the desired oxygenated steroid then can be evaporated to yield the desired product which may be further purified by recrystallization or other procedures conventional in the art.

Alternatively, the process of the invention can be effected by contacting the enzymes produced by the fermentation of *Bacillus cereus* with the steroid. This can be accomplished by recovering the enzymes from a fermentation broth in accordance with procedures known in the art, and intimately contacting such enzymes with a steroid in an aqueous medium.

The following examples illustrate methods of carrying the process of the present invention, but it is to be understood that these examples are given for purposes of illustration and not of limitation.

EXAMPLE I

Approximately 40 ml. of the nutrient medium shown hereinabove in 250 ml. Erlenmyer shake-flasks is sterilized for 15 minutes at 121°C. After sterilization, the medium is inoculated with a loop of growth from a slant of a strain of *Bacillus cereus* culture, ATCC No. 14,737. The mixture is then agitated on a rotary shaker at 220 rpm using a 2 inch stroke and maintaining the temperature at 28°C. for a period of approximately 24 hours. At the end of the 24-hour period, the growth is used to inoculate 10 flasks of the same medium using a 10% inoculum level.

At the end of a 24 hour period, 1 ml. of ethanol containing 10 mg. of Compound S is charged to each flask and agitation of the medium is continued for a period of 16 hours.

Following the conversion period the steroid containing fermented medium is adjusted to a pH of 4.0 and extracted five times with one-half volume amounts of ethyl acetate. Crystalline prednisolone then is isolated from the combined extracts by removal of ethyl acetate in vacuo.

EXAMPLE II

Following the process described in detail above and using the medium given below in place of the one used in Example I there is produced a similar conversion of Compound S to prednisolone.

| Meat Extract | 0.2% |
|---|---|
| Polypeptone | 0.2% |
| Glycerol | 0.2% |
| pH | 7.0 |

EXAMPLE III

Following the procedure described in Example I and using 1,5,25,50 mg. of Compound S in place of 10 mg. of Compound S the compound prednisolone is produced.

EXAMPLE IV

Following the process eescribed in Example II, 16α-methyl compound S is substituted for Compound S and 16α-methylprednisolone is produced.

EXAMPLE V

Using the procedure of Examples I and II, the following compounds are converted to the corresponding $\Delta^1$-11β-hydroxy steroids:

$\Delta^4$-estrene-3β, 17β-diol;
3β, 17β-dihydroxy-4,17α-dimethyl-$\Delta^4$-androstene;
3,17-dioxo-6α-fluoro-$\Delta^4$-androstene;
16α-hydroxy-$\Delta^4$-androstene-3,17-dione;
16β-methyl-$\Delta^4$-19-norandrostene-3,17-dione;
$\Delta^4$-androstene-3,17-dione;
$\Delta^4$-19-norandrostene;
3,17-dione-testosterone;
2α-methyl-17α-ethyltestosterone;
4-methylprogesterone;
4-chloro-$\Delta^{4,6}$-pregnadiene-3,20-dione;
$\Delta^6$-progesterone;
6α-methylprogesterone;
6α-fluoroprogesterone;
6-chloro-17α-acetoxy-$\Delta^6$-progesterone;
6β-hydroxy-16α, 17α-epoxyprogesterone;
6β-fluoro-17α-hydroxy-19-norprogesterone; and
19-norprogesterone.

Many of the compounds which are prepared in accordance with the process of this invention are themselves therapeutically useful because of hormonal activity. Others are especially useful as intermediates for the preparation of therapeutically useful steroids. Still others, although exhibiting an appreciable degree of physiological activity, are especially useful as intermediates for the preparation of derivatives having increased physiological activity. These conversions may be effected by procedures well known in the art. For example, the 11-hydroxylated steroids are converted to the corresponding 9α-fluoro-11β-hydroxy steroids by the well known procedure of Fried and Sabo; 17-oxo-androstadienes are readily converted to the corresponding 17β-hydroxy-17α ethynyl or haloethynyl derivatives by reaction with organometallic compounds; and the like.

While the invention has been described with particular reference to certain preferred embodiments thereof, it will be understood that various additions and modifications may be made which are within the skill of the art.

What is claimed is:

1. The process which comprises subjecting a steroid substrate comprising a $\Delta^4$-steroid unsubstituted at C–11 to the oxygenating-dehydrogenating action of an 11β-hydroxylating-$\Delta^1$-dehydrogenating strain of *Bacillus cereus*, thereby producing the corresponding 11β-hydroxy-$\Delta^{1,4}$-steroid, and recovering the 11β-hydroxy-$\Delta^{1,4}$-steroid thus produced from the oxygenated-dehydrogenation mixture; said 11β-hydroxylating-$\Delta^1$-dehydrogenating strain being characterized in that, when an established 28-hour culture of said strain containing approximately 0.025% of 4-pregnene-17α,21-diol-3,20-dione is incubated for about 16 hours at approximately 28°C., and the ethyl acetate-extractible components of the resulting fermentation broth are subjected to paper chromatography using formamide-chloroform system, there is obtained a band corresponding to 1,4-pregnadiene-11β, 17α,21-triol-3,20-dione and having ultraviolet absorption maximum of 242 μ.

2. The process as defined in claim 1 in which the steroid substrate is selected from the group which consists of 1,2-dihydro-11-desoxy-3-oxygenated-4-pregnenes; 1,2-dihydro-11-desoxy-3-oxygenated-4-androstenes; and 1,2-dihydro-11-desoxy-3-oxygenated-4-estrenes, and the 11β-hydroxy-$\Delta^{1,4}$-steroid product is the corresponding 11β-hydroxy-3-oxygenated-1,4-pregnadiene; 11β-hydroxy-3-oxygenated-1,4-androstadiene; or 11β-hydroxy-3-oxygenated 1,4-estradiene.

3. The process as defined in claim 1 in which the 11β-hydroxylating-$\Delta^1$-dehydrogenating strain of *Bacillus cereus* utilized is that having the ATCC No. 14,737.

4. The process as defined in claim 1 in which prednisolone is produced by subjecting 4-pregnene-17α, 21-diol-3,20-dione to the action of 11β-hydroxylating-$\Delta^1$-dehydrogenating enzymes produced by *Bacillus cereus*, ATCC No. 14,737, microorganisms.

* * * * *